US010428687B2

(12) United States Patent
Sharma et al.

(10) Patent No.: US 10,428,687 B2
(45) Date of Patent: Oct. 1, 2019

(54) HEAT PIPE IN TURBINE ENGINE ROTOR

(71) Applicant: General Electric Company, Schenectady, NY (US)

(72) Inventors: Ashish Sharma, Munich (DE); Daniel J. Laborie, Evendale, OH (US)

(73) Assignee: General Electric Company, Schenectady, NY (US)

(*) Notice: Subject to any disclaimer, the term of this patent is extended or adjusted under 35 U.S.C. 154(b) by 437 days.

(21) Appl. No.: 15/246,869

(22) Filed: Aug. 25, 2016

(65) Prior Publication Data

US 2018/0058259 A1    Mar. 1, 2018

(51) Int. Cl.
| *F01D 5/08* | (2006.01) |
| *F01D 5/18* | (2006.01) |
| *F01D 25/12* | (2006.01) |
| *F04D 29/58* | (2006.01) |
| *F28D 15/02* | (2006.01) |
| *F28D 15/04* | (2006.01) |
| *F28D 21/00* | (2006.01) |

(52) U.S. Cl.
CPC .............. *F01D 25/12* (2013.01); *F01D 5/087* (2013.01); *F04D 29/584* (2013.01); *F28D 15/02* (2013.01); *F28D 15/0208* (2013.01); *F28D 15/0233* (2013.01); *F28D 15/0275* (2013.01); *F28D 15/04* (2013.01); *F01D 5/181* (2013.01); *F05D 2220/32* (2013.01); *F05D 2240/24* (2013.01); *F05D 2240/60* (2013.01); *F05D 2260/208* (2013.01); *F28D 2021/0026* (2013.01); *Y02T 50/672* (2013.01); *Y02T 50/673* (2013.01); *Y02T 50/676* (2013.01)

(58) Field of Classification Search
CPC .......... F01D 5/087; F01D 5/181; F01D 25/12; F04D 29/584; F28D 15/04; F28D 15/02; F28D 15/0208; F28D 15/0275; F28D 2021/0026; F05D 2220/32; F05D 2240/24; F05D 2220/40; F05D 2260/208; Y02T 50/672; Y02T 50/673; Y02T 50/676

See application file for complete search history.

(56) References Cited

U.S. PATENT DOCUMENTS

| 3,842,596 A * | 10/1974 | Gray ...................... F01D 5/088 |
| | | 165/104.25 |
| 3,999,400 A | 12/1976 | Gray |
| 4,262,483 A | 4/1981 | DeGeus |
| 7,768,164 B2 | 8/2010 | Michel et al. |
| 8,475,112 B1 * | 7/2013 | Ryznic .................... F02C 6/08 |
| | | 415/1 |
| 2009/0120099 A1 * | 5/2009 | Brand .................... F01D 25/02 |
| | | 60/785 |
| 2011/0100020 A1 * | 5/2011 | Zhang .................... F01D 5/185 |
| | | 60/806 |
| 2015/0168077 A1 | 6/2015 | Hodowanec et al. |
| 2017/0244306 A1 * | 8/2017 | Lin ........................ H02K 9/20 |
| 2017/0363007 A1 * | 12/2017 | Xu ........................ F01D 5/181 |

FOREIGN PATENT DOCUMENTS

EP            0152785        8/1985

* cited by examiner

*Primary Examiner* — Igor Kershteyn
(74) *Attorney, Agent, or Firm* — Dority & Manning, P.A.

(57) ABSTRACT

The present disclosure is directed to a rotating component for a turbine engine. The rotating component defines a surface and includes a heat pipe positioned on the surface of the rotating component or within the rotating component. The heat pipe includes a working fluid and an outer perimeter wall.

19 Claims, 9 Drawing Sheets

FIG. 12

HEAT PIPE IN TURBINE ENGINE ROTOR

FIELD OF THE INVENTION

The present invention relates generally to thermal management of turbine engine rotating components. More specifically, the present invention relates to reducing the thermal gradient of rotating components in turbine engines.

BACKGROUND OF THE INVENTION

Advances in turbine engine aero- and thermodynamic performance have led to increasingly larger thermal gradients across turbine engine rotating components. Larger thermal gradients, as well as the turbine engine duty cycle, induce high cycle fatigue (HCF) and low cycle fatigue (LCF), ultimately reducing the structural life of rotating components. Additionally, thermal gradients are at least partially responsible for thermal bowing, or bowed rotor, in rotating components such as shafts, due to asymmetric cooling following turbine engine shutdown.

HCF, LCF, and bowed rotor may result in rotating component failure during turbine engine operation or necessitate replacement of the rotating components at smaller intervals, thereby increasing turbine engine operating costs. HCF, LCF, and bowed rotor may also induce damage to other turbine engine components, such as bearings and casings, due to deformation of adjacent rotating components, which may result in decreased turbine engine efficiency, performance, and structural life.

Increasing rotating component thicknesses, using denser materials, and directing cooler air from the propulsive thermodynamic cycle to rotating components are known to reduce thermal gradients, thereby increasing structural life and mitigating bowed rotor. Additionally, instituting a longer cool-down period during turbine engine shutdown or between shutdown and restart is known to mitigate bowed rotor. However, directing air from the propulsive thermodynamic cycle and using thicker or denser materials reduces turbine engine efficiency and increases fuel consumption by reducing the energy available for, or requiring additional energy for, propulsive thrust. Furthermore, longer cool-down regimes increase the amount of time before the turbine engine can be restarted, which may have an economic affect similar to reduced engine efficiency or increased fuel consumption.

Therefore, there is a need for reducing the thermal gradient across rotating components while mitigating adverse effects to turbine engine performance, efficiency, and economics.

BRIEF DESCRIPTION OF THE INVENTION

Aspects and advantages of the invention will be set forth in part in the following description, or may be obvious from the description, or may be learned through practice of the invention.

The present disclosure is directed to a rotating component for a turbine engine. The rotating component defines a surface and includes a heat pipe positioned on the surface of the rotating component or within the rotating component. The heat pipe includes a working fluid and an outer perimeter wall.

A further aspect of the present disclosure is directed to a turbine engine. The turbine engine includes a rotating component defining a surface and a heat pipe positioned on the surface of the rotating component or within the rotating component. The heat pipe includes a working fluid and an outer perimeter wall. The turbine engine further includes a compressor section including a plurality of rotating components, a turbine section including a plurality of rotating components, and a fan section including a plurality of rotating components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A rotating component of a turbine engine including a heat pipe on a surface of the rotating component or within the rotating component is generally provided. A heat pipe is a heat transfer device that combines thermal conductivity and phase transition to efficiently manage heat transfer between two interfaces. Heat pipes use evaporative cooling to transfer thermal energy from an evaporator end to condenser end by a cycle of evaporation and condensation of a working fluid. As the evaporator end is heated, the working fluid at the evaporator end is heated and evaporates into a vapor fluid. Centrifugal forces or a difference in pressure from the heated evaporator end and the cooler condenser end causes the heated vapor fluid to transfer to the cooler condenser end. The vapor fluid transfers thermal energy to the condenser end and condenses into a condensed fluid. The condensed fluid at the condenser end transfers to the evaporator end as the vapor fluid at the evaporator end transfers to the condenser end, thus creating a heat transfer cycle. Altogether, the heat pipe on or within the rotating component may reduce the thermal gradient from the evaporator end of the rotating component to the condenser end by cooling the evaporator end and heating the condenser end. Therefore, a rotating component with heat pipes may reduce the thermal gradient across a rotating component in a turbine engine compressor section, turbine section, or fan section.

Although further described below generally with reference to a turbofan engine 10, the present disclosure is also applicable to turbomachinery in general, including turbojet, turboprop and turboshaft gas turbine engines, including industrial and marine turbine engines and auxiliary power units.

Figure 1:
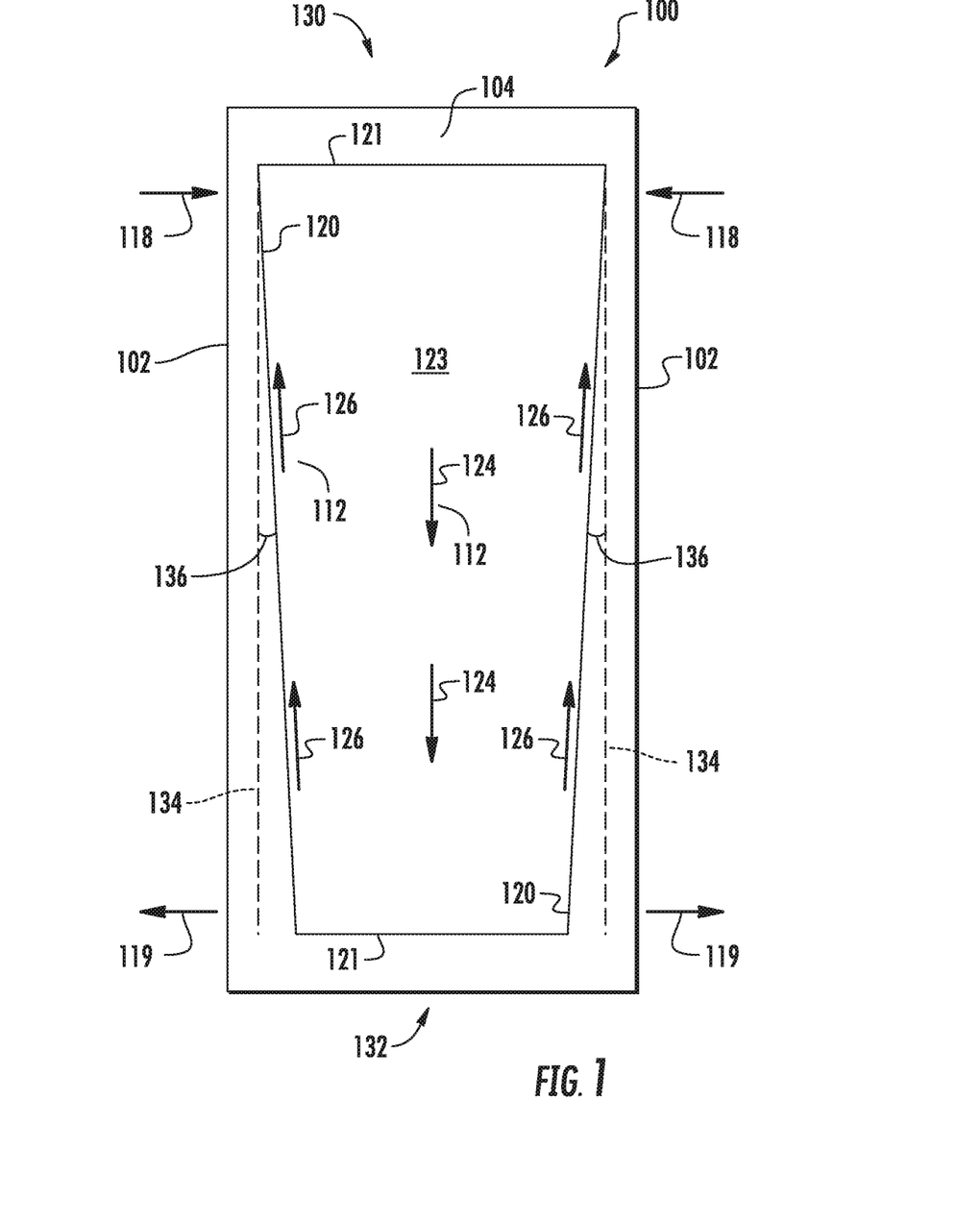
FIG. 1 is a cross sectional view of an exemplary rotating component with a heat pipe.

Referring now to the drawings, FIG. 1 is a cross sectional view of an exemplary rotating component 100 including a heat pipe 104. The rotating component 100 defines a surface 102. The heat pipe 104 is positioned within the rotating component 100 between the surfaces 102 of the rotating component 100 in the embodiment shown. However, in other embodiments, the heat pipe 104 may be positioned on the surface 102 of the rotating component 100. The heat pipe 104 includes a working fluid 112 and an outer perimeter wall 120. The outer perimeter wall 120 defines an enclosed vapor cavity 123, such as, e.g. an annulus, including an end wall 121 to retain the working fluid 112 within the vapor cavity 123. The heat pipe 104 includes an evaporator end 130 disposed radially outward of the rotating component 100 and a condenser end 132 disposed radially inward of the rotating component 100.

Integrating the heat pipe 104 into or onto the surface 102 of the rotating component 100 may provide passive thermal management to reduce the thermal gradient from the evaporator end 130 to the condenser end 132 of the rotating component 100. The heat pipe 104 combines thermal conductivity and phase transition to efficiently manage heat transfer by employing evaporative cooling to transfer thermal energy from the evaporator end 130 to a condenser end 132 by a cycle of evaporation and condensation of the working fluid 112. Thermal energy 118 is transferred to the evaporator end 130 of the rotating component 100 including the heat pipe 104, which heats the working fluid 112, as a liquid working fluid 126, in the vapor cavity 123. In one embodiment, thermal energy 118 is derived from hot gases in a core flowpath of an engine or heat build-up from a rotating surface during engine operation. The liquid working fluid 126 at the evaporator end 130 is heated and evaporates to become a vapor working fluid 124. The vapor working fluid 124 transfers thermal energy from the evaporator end 130 to the condenser end 132, in which the vapor working fluid 124 transfers heat 119 out of the heat pipe 104 at the condenser end 132. The vapor working fluid 124 cools and condenses into the liquid working fluid 126 at the condenser end 132. The liquid working fluid 132 flows toward the evaporator end 130 by centrifugal forces from rotation of the rotating component 100.

In the heat pipe 104 shown in FIG. 1, the outer perimeter wall 120 converges at an angle 136 defined by a reference line 134. The converging angle 136 of the outer perimeter wall 120 may define a cross sectional area of the vapor cavity 123 that is greater at the evaporator end 130 than at the condenser end 132. The degree of the angle 136 may be influenced by the vector of the centrifugal forces on the heat pipe 104 or working fluid 112. The converging angle 136 may promote movement of the working fluid 112 toward the evaporator end 130. However, in other embodiments, the angle 136 may be zero (i.e. the outer perimeter wall is non-converging).

Figure 2:
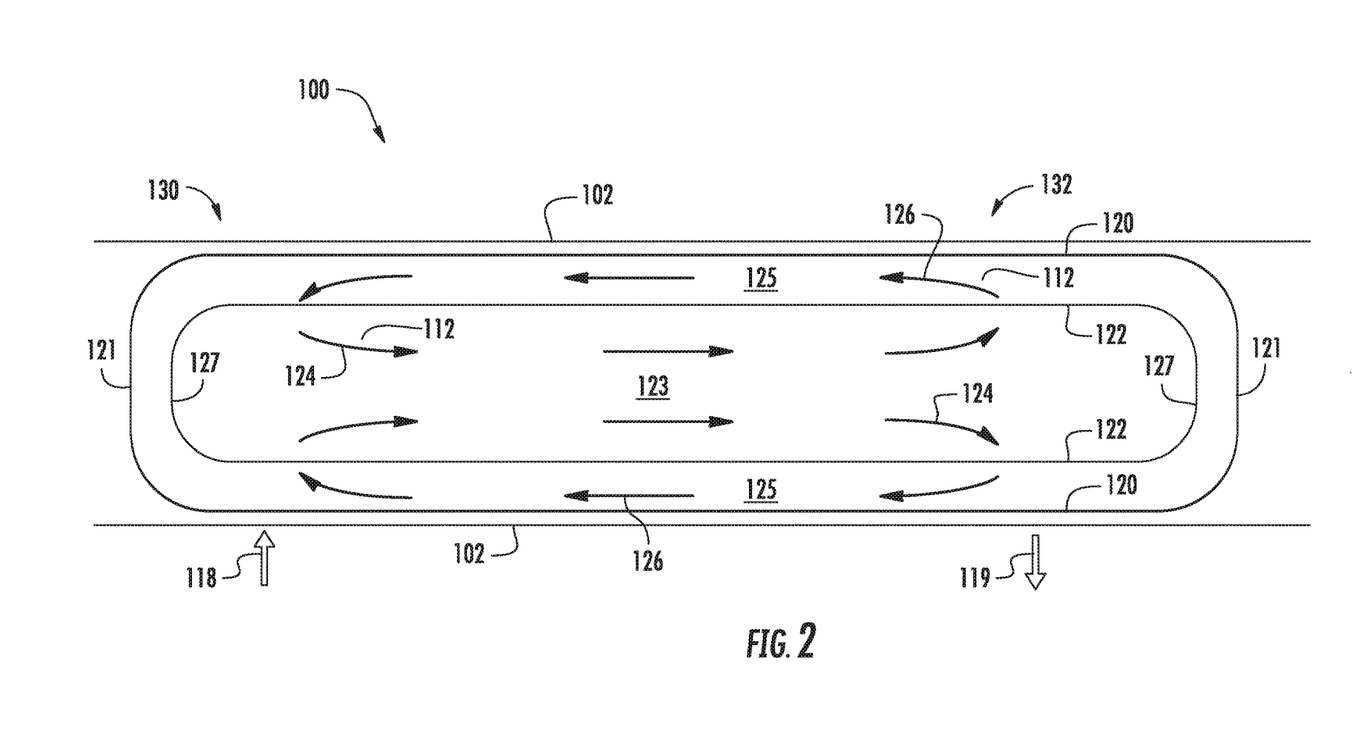
FIG. 2 is a cross sectional view of another exemplary rotating component with a heat pipe.

Referring now to FIG. 2, a cross sectional view of another exemplary embodiment of a rotating component 100 including a heat pipe 104 is provided. The heat pipe 104 includes an outer perimeter wall 120 and an inner perimeter wall 122. The outer perimeter wall 120 and the inner perimeter wall 122 define a capillary tube 125 therebetween containing the working fluid 112. The outer perimeter wall 120 defines an end wall 121 to seal the capillary tube 125. The inner perimeter wall 122 defines an enclosed vapor cavity 123, such as an annulus, including a defined inner perimeter end wall 127 to retain the working fluid 112, as a liquid working fluid 126, within the vapor cavity 123. The capillary tube 125 encompasses the vapor cavity 123. In one embodiment, the capillary tube 125 may define a wick structure extending from the outer perimeter wall 120 to the inner perimeter wall 122. The wick structure may include, for example, a screen wick, open channels or grooves extending from the outer perimeter wall 120, a plurality of arteries or tubes, or a corrugated screen, or a combination thereof. As such, the capillary tube 125 permits the liquid working fluid 126 to flow from the condenser end 132 to the evaporator end 130 due to the difference in pressure from the condenser end 132 to the evaporator end 130. The inner perimeter wall 122 of the capillary tube 125 permits the working fluid 112 to condense and evaporate through the inner perimeter wall 122. A vapor working fluid 124 flows through the vapor cavity 123 from the evaporator end 130 to the condenser end 132 due to a difference in pressure between the two sections 130, 132.

It should be appreciated that the rotating component 100 including the heat pipe 104 shown in FIGS. 1-2 and further described herein may further define an approximately adiabatic section between the evaporator end 130 and the condenser end 132 in which thermal energy is neither entering nor exiting the heat pipe in significant magnitude.

Referring now to FIG. 1 and FIG. 2, the working fluid 112 in the heat pipe 104 is a two-phase fluid that may operate within the desired temperature range of the rotating component 100. At the evaporator end 130 of rotating component 100 including the heat pipe 104, the working fluid 126 should evaporate, while at the condenser end 132 the working fluid 112 should condense. The desired working fluid 112 in the heat pipe 104 is at least partially a function of the heat transfer requirements of the heat pipe 104 or rotating component 100, including the range of temperature exposed to the evaporator end 130 and the condenser end 132 of rotating component 100 to which the heat pipe 104 is installed. In various embodiments, the working fluid 112 in the heat pipe 104 includes, but is not limited to, helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, cesium, potassium, sodium, lithium, silver, or combinations thereof.

Additionally, the desired working fluid 112 is at least partially a function of the material of the rotating component 100 or the outer perimeter wall 120 in which the working fluid 112 resides. In one embodiment, the rotating component 100 is a first material and the outer perimeter wall 120 of the heat pipe 104 is a second material of a different composition than the first material. The inclusion of a different material composition for the outer perimeter wall 120 of the heat pipe 104 may enable certain working fluids 112 to be employed that are incompatible with materials such as, for example, titanium, titanium alloys, nickel, or nickel alloys.

As a non-limiting example, in various embodiments the first material of the rotating component 100 may be a titanium alloy, a nickel alloy, or a composite material. The second material of the outer perimeter wall 120 of the heat pipe 104 may be aluminum. Compatible working fluids 112 may include ammonia, trichlorofluoromethane, trichlorotrifluoroethane, dichlorofluoromethane, heptane or combinations thereof. As another non-limiting example, in another embodiment the second material of the outer perimeter wall 120 may be a stainless steel. Compatible working fluids 112 may include water, methanol, sodium, cesium, or mercury.

In an embodiment where the rotating component 100 is a first material and the outer perimeter wall 120 of the heat pipe 104 is a second material, the heat pipe 104 may be attached onto the surface 102 of the rotating component 100, or integrally cast between the surfaces 102 of the rotating component 100, or attached by way of additive manufacturing, welding, bonding, or a mechanical fastener. The surfaces 102 of the rotating component 100 may define a groove, slot, cavity, or treated surface onto or between which the heat pipe 104 including the outer perimeter wall 120 may position.

It should be appreciated, however, that the heat pipe 104 installed onto the surface 102 of the rotating component 100, or between the surfaces 102 of the rotating component 100, including the outer perimeter wall 120 of the heat pipe 104, may include other materials, such as, but not limited to, steel, stainless steel, copper, silica, nickel, titanium, aluminum, iron, brass, tungsten, tantalum, molybdenum, niobium, or alloys or combinations of each or thereof.

In another embodiment, a rotating component 100 may define a surface 102 and an outer perimeter wall 120 of the same material. For example, the rotating component 100 may define the outer perimeter wall 120 as internal and opposite of the surface 102 of the rotating component 100. The rotating component 100 including the outer perimeter wall 120 of an integrally constructed heat pipe 104 may be constructed of the same material using a number of manufacturing and processing means, including, but not limited to, additive manufacturing, investment casting, CNC machining, or electro-chemical machining.

Figure 3:
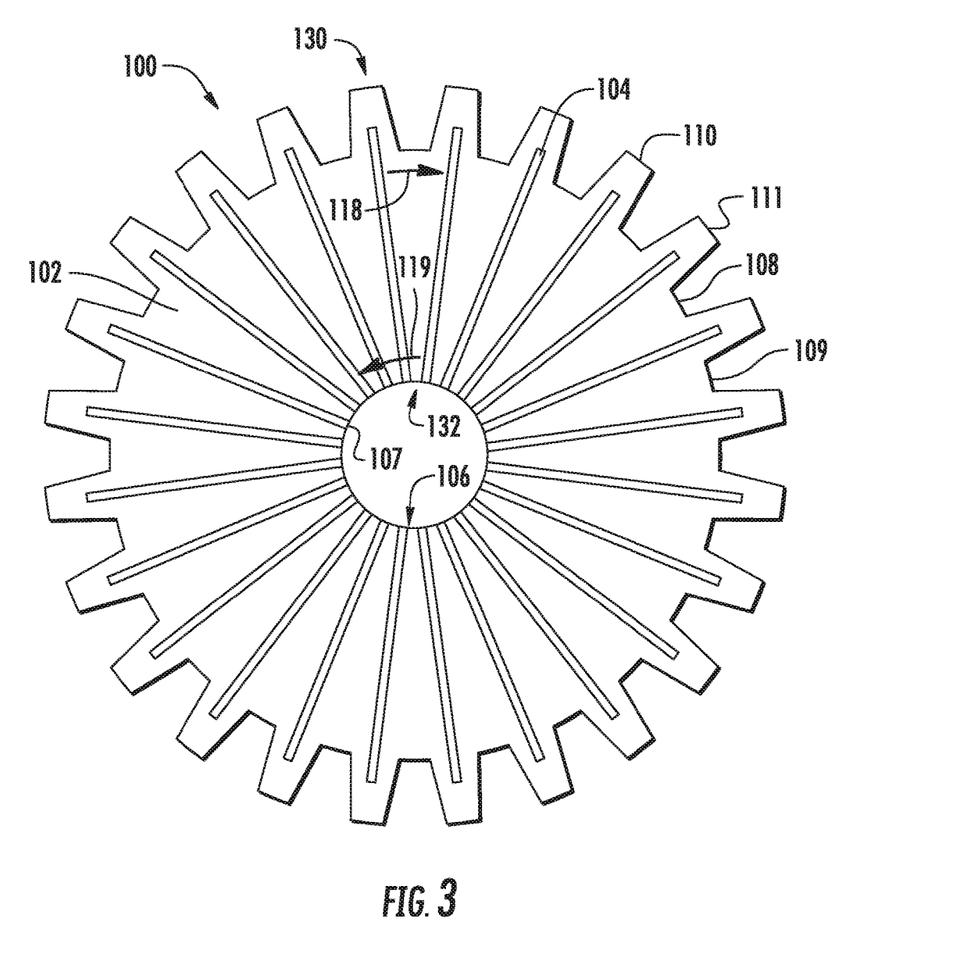
FIG. 3 is a side view of an exemplary rotating component defining a disk with a heat pipe.

Referring now to FIG. 3, an exemplary embodiment of a rotating component 100 including a heat pipe 104 is shown. The rotating component 100 defines a disk having a bore 107 defined by an inner diameter 106, a rim 109 defined by a first outer diameter 108, and a dovetail 111 extending from the first outer diameter 108 to a second outer diameter 110. The rotating component 100 defines a surface 102 onto which a heat pipe 104 is positioned. In another embodiment, the rotating component 100 defines surfaces 102 between which the heat pipe 104 is positioned. In the embodiment shown in FIG. 3, the heat pipe 104 extends radially from the bore 107. The rotating component 100 defining a disk may include a plurality of heat pipes 104 radially extending on or within the disk. In the embodiment shown in FIG. 3, a plurality of heat pipes 104 extends radially from the bore 107 to the dovetail 111. However, in other embodiments, the plurality of heat pipes 104 may extend from a first radius to a second radius radially between the bore 107 and the dovetail 111. Additionally, in other embodiment, the heat pipes 104 may extend in a non-radial direction (e.g., at an angle to the radial direction). It should also be appreciated that the heat pipe 104 as shown in FIG. 3 may be positioned on the surface 102 of the rotating component or between the surfaces 102 of the rotating component.

The rotating component 100 shown in FIG. 3 further includes an evaporator end 130 disposed toward the first and second outer diameters 108, 110 defined by the dovetails 111 and a condenser end 132 disposed toward the inner diameter 106. In one embodiment, the rotating component 100 defining a disk may be disposed at the outer diameters 108, 110 to hot gases in a core flowpath of an engine and be disposed at the inner diameter 106 to cooler air at a shaft of a turbine engine. Therefore, the cooler inner diameter 106 proximate to the cooler air at the shaft of the turbine engine may define the condenser end 132 of the heat pipe 104 and the hotter outer diameters 108, 110 proximate to the hot gases in the core flowpath may define the evaporator end 130 of the heat pipe 104 on or within the disk.

Figure 4:
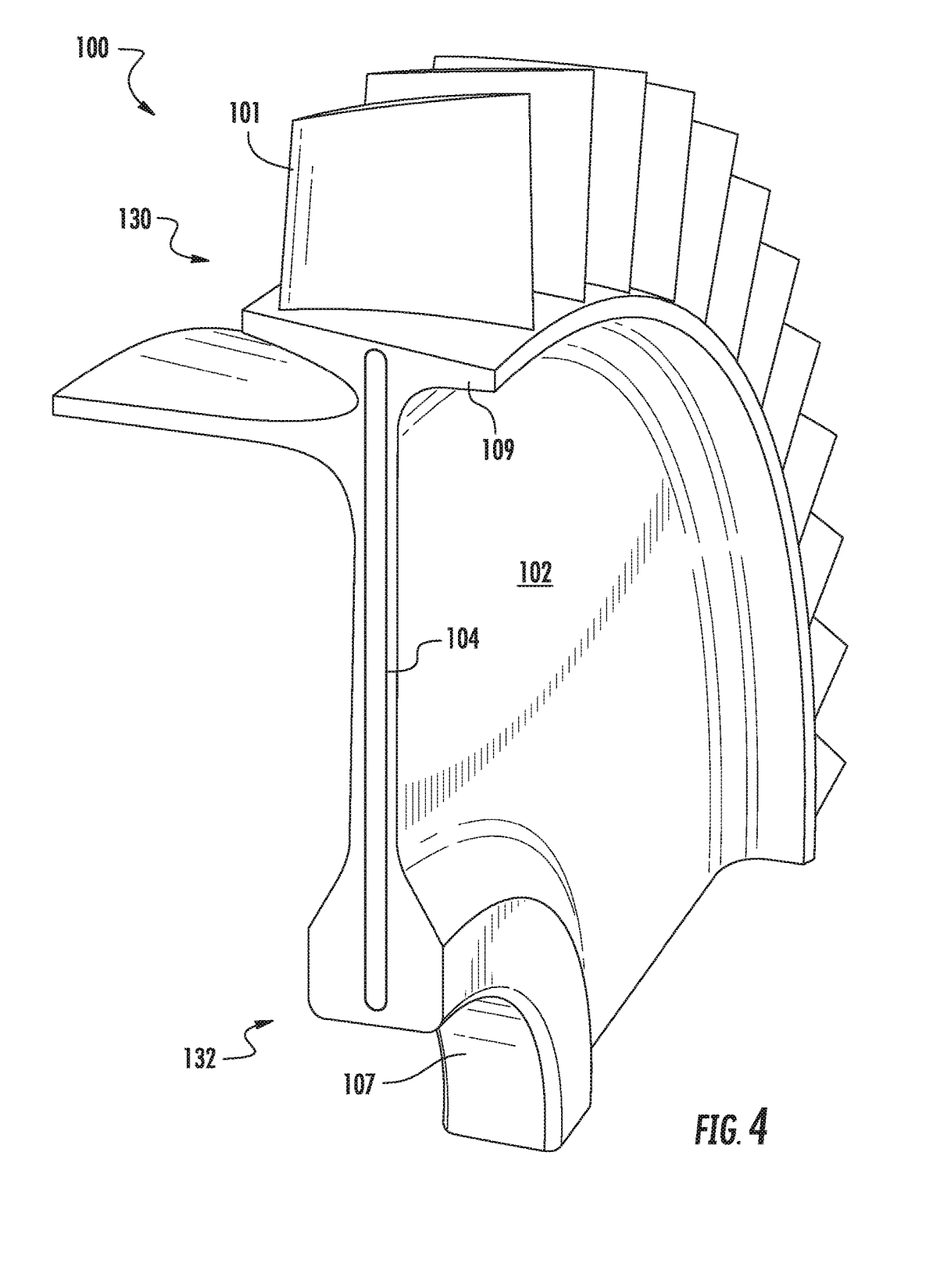
FIG. 4 is a cutaway perspective view of another exemplary rotating component defining a disk with a heat pipe.

Referring now to FIG. 4, a cutaway perspective view of a rotating component 100 defining a disk including a heat pipe 104 between the surfaces 102 of the rotating component 100 is provided. The disk includes an airfoil 101 in which the heat pipe 104 radially extends to the airfoil 101. In the embodiment shown, the rotating component 100 defines a bladed disk such as an integrally bladed rotor (IBR). In such an embodiment, the airfoils and the heat pipe 104 of the bladed disk may be manufactured through processes including, but not limited to, CNC machining, investment casting, electro-chemical milling, or friction bonding.

Figure 5:
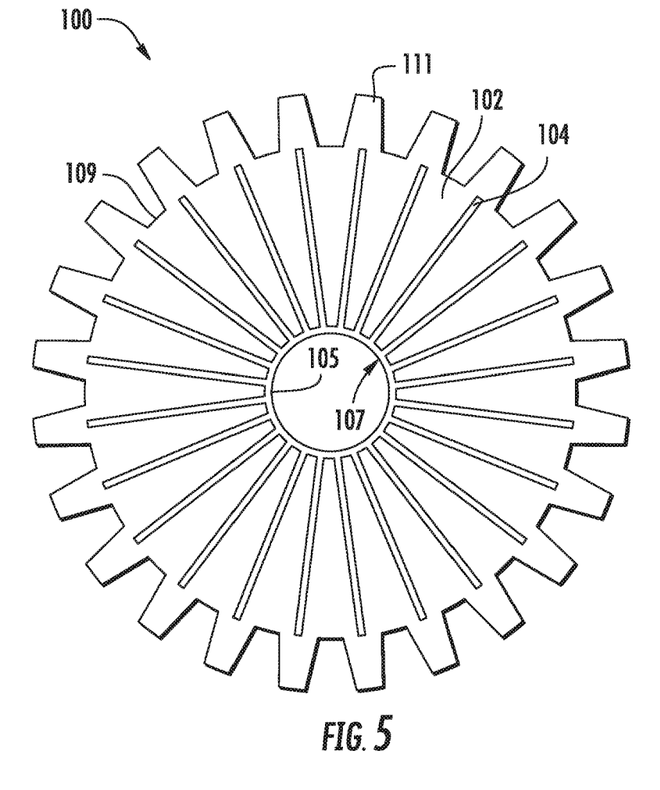
FIG. 5 is a side view of yet another exemplary rotating component defining a disk with a heat pipe.

Referring now to FIG. 5, a rotating component 100 defining a disk including a plurality of heat pipes 104 is shown. The exemplary rotating component 100 of FIG. 5 may be configured in substantially similar manner as the exemplary rotating component of FIGS. 1-4. However, for the embodiment in FIG. 5, the rotating component 100 further includes a circumferentially extended heat pipe 105 at a radius of the disk. In the embodiment shown in FIG. 5, the circumferentially extended heat pipe 105 is positioned at the bore 107 of the disk. The circumferentially extended heat pipe 105 intersecting the heat pipes 104 extending radially from the bore 107 are in fluid communication.

Figure 6:
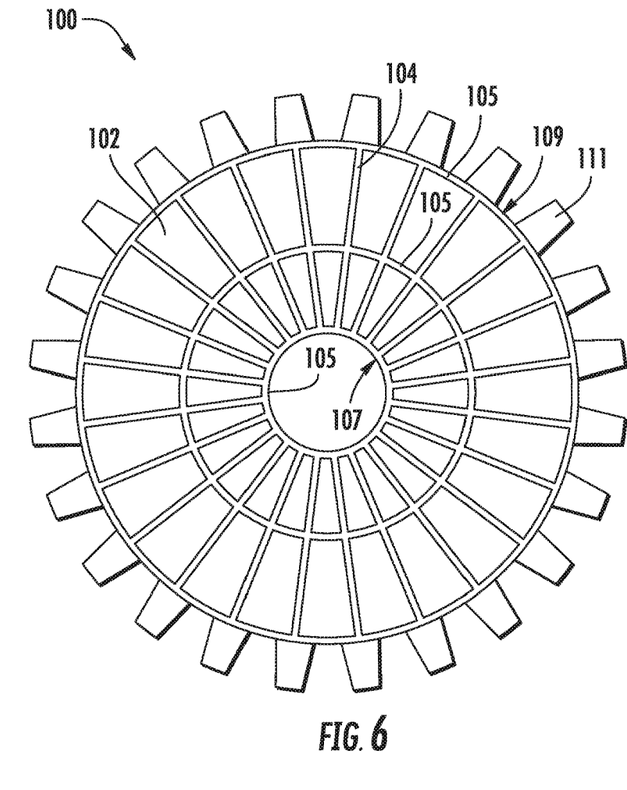
FIG. 6 is a side view of still another exemplary rotating component defining a disk with a heat pipe.

Referring now to FIG. 6, another exemplary rotating component 100 defining a disk including a plurality of heat pipes 104, 105 is shown. The exemplary rotating component 100 of FIG. 6 may be configured in substantially similar manner as the exemplary rotating component of FIG. 1-5. However, the embodiment in FIG. 6 includes a circumferentially extended heat pipe 105 positioned at the rim 109 of the rotating component 100 defining a disk. Additionally, FIG. 6 shows a circumferentially extended heat pipe 105 positioned at a radius between the bore 107 and the rim 109. In the embodiment shown in FIG. 6, the plurality of heat pipes 104, 105 radially and circumferentially extended and intersecting on or within the rotating component 100 are in fluid communication. However, in other embodiments, a portion of the heat pipes 104, 105 may be fluidly disconnected from another portion of heat pipes 104, 105. For example, the circumferentially extended heat pipe 105 positioned at the rim 109 may be fluidly disconnected from the circumferentially extended heat pipe 105 positioned at the bore 107 or another radius therebetween. As another example, the circumferentially extending heat pipes 105 may be configured as a plurality of portions of circumferentially extended heat pipes 105 fluidly disconnected from other portions of circumferentially extended heat pipes 105.

Figure 7:
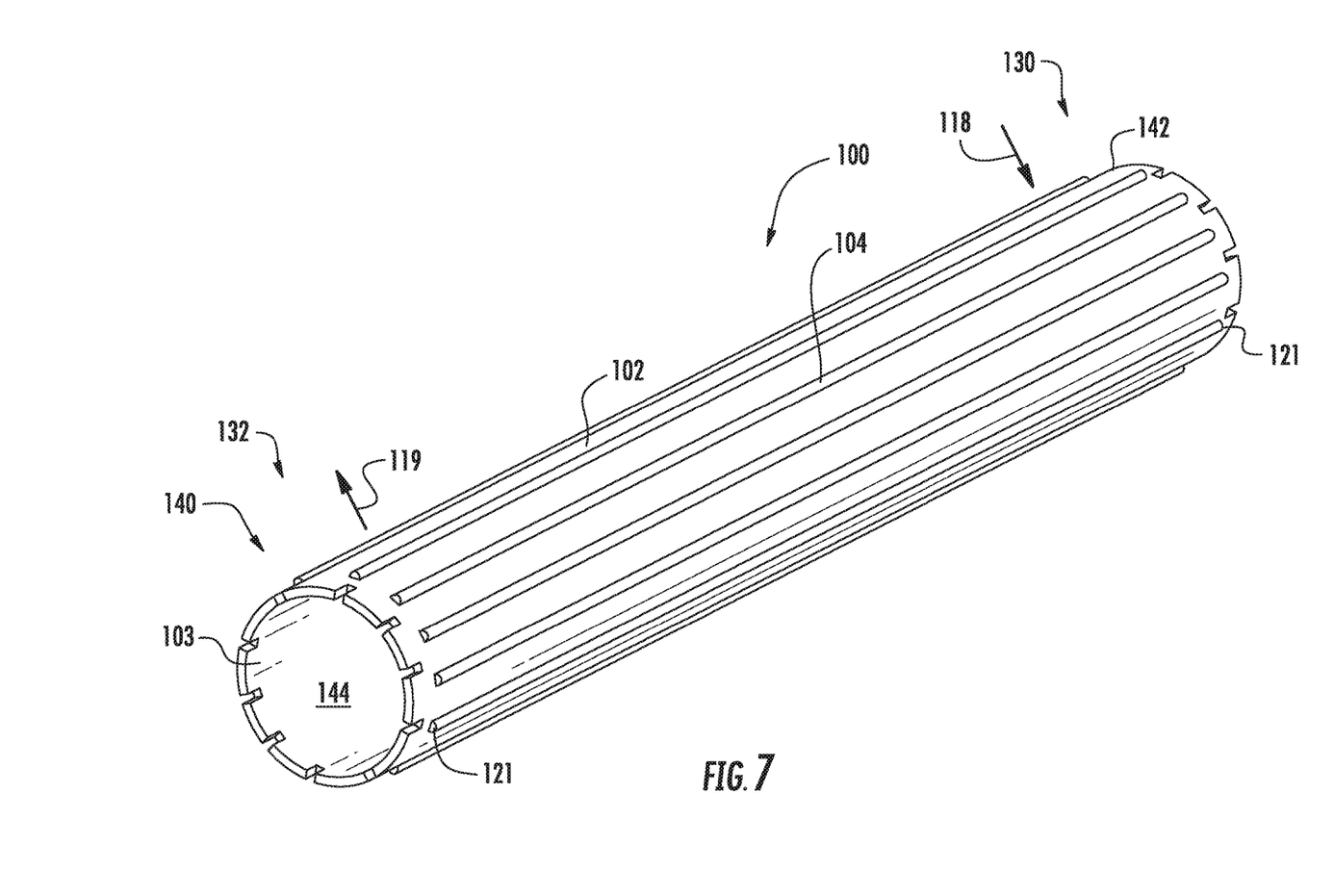
FIG. 7 is a perspective view of an exemplary rotating component defining a shaft with a heat pipe.

Referring now to FIG. 7, a perspective view of an exemplary embodiment of a rotating component 100 including a heat pipe 104 is shown. The rotating component 100 defines a shaft in which the shaft includes a first end 140 and a second end 142. A plurality of heat pipes 104 extends axially from the first end 140 to the second end 142, in which each heat pipe 104 is in circumferentially adjacent arrangement on the surface 102 of the rotating component 100 defining the shaft. The surface 102 of the rotating component 100 defines an outer diameter of the shaft. A second surface 103 defines an inner diameter of the shaft. The second surface 103 further defines a hollow, axially elongated cavity 144 radially inward of the second surface 103.

The rotating component 100 includes an evaporator end 130 disposed toward the second end 142 and a condenser end 132 disposed toward the first end 140. In one embodiment of the rotating component 100 shown in FIG. 7, the rotating component 100 defining a shaft may be disposed at the first end 140 at a cooler compressor section or fan section of a turbine engine and disposed at the second end 142 at a hotter turbine section or power gearbox of a turbine engine. Therefore, the cooler first end 140 proximate to the cooler compressor section or fan section may define the condenser end 132 of the shaft and the hotter second end 142 proximate to the hotter turbine section or power gearbox may define the evaporator end 130 of the shaft.

The transfer of thermal energy from the evaporator end 130 to the condenser end 132, such as radially from the hot gases of the core flowpath to the inner diameter of a rotating component 100 defining disk, or axially from the hotter turbine section to the cooler compressor section of a rotating component 100 defining a shaft, reduces the thermal gradient (i.e. the difference in temperature from one point to another) along the rotating component 100. Reducing the thermal gradient may reduce high cycle fatigue (HCF), low cycle fatigue (LCF), and mitigate bowed rotor, thereby increasing the structural life of the rotating component 100 and the engine to which it is installed.

Referring now to FIGS. 8-11, radial cross sectional views of exemplary embodiments of a rotating component 100 including a heat pipe 104 are shown. The exemplary rotating components 100 of FIGS. 8-11 may be configured in substantially similar manner as the exemplary rotating components described in regard to FIGS. 1-7.

Figure 8:
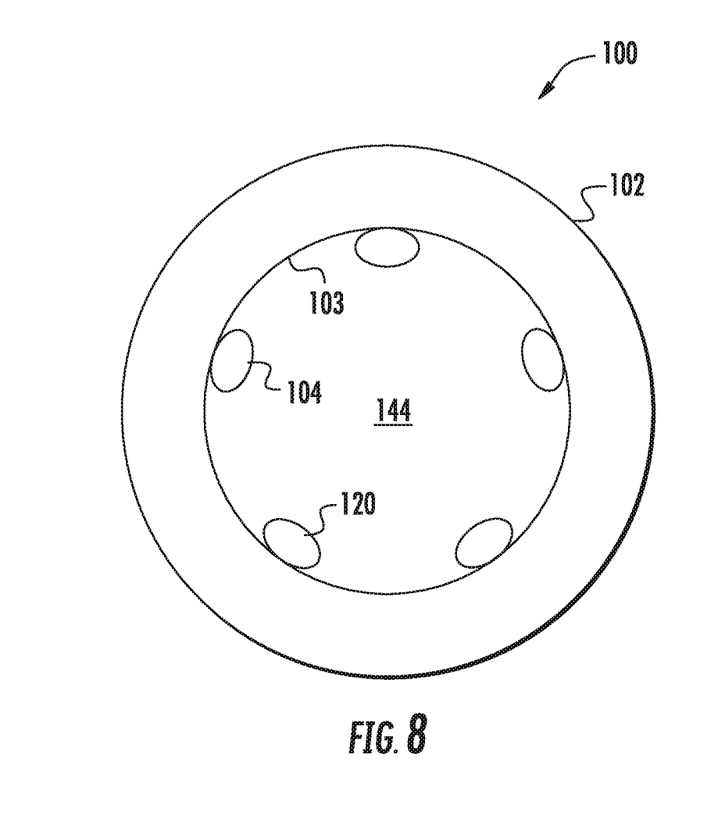
FIG. 8 is a radial cross sectional view of a rotating component defining a shaft with a heat pipe.

Referring to FIG. 8, a plurality of heat pipes 104 are positioned on a second surface 103 defining an inner diameter of a rotating component 100 defining a shaft. The heat pipes 104 are within a hollow, axially elongated cavity 144 defined radially inward of the second surface 103.

Figure 9:
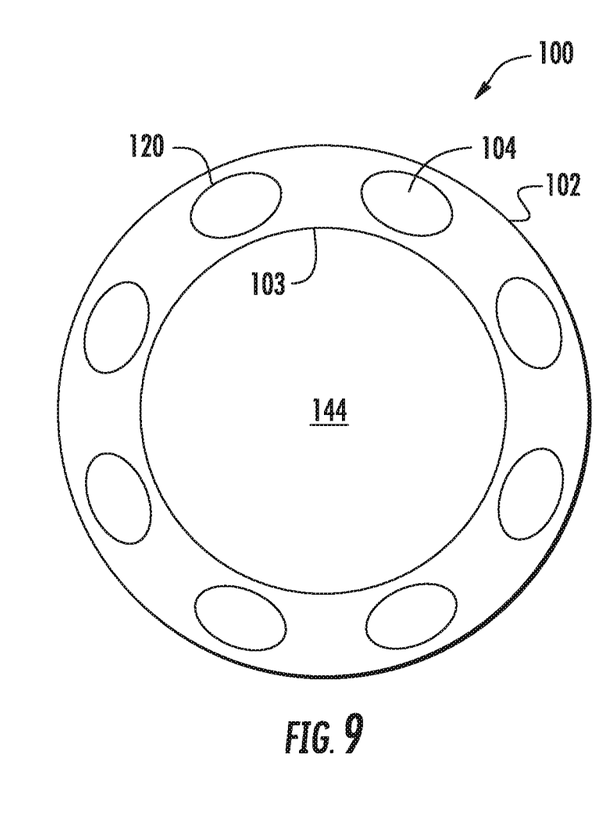
FIG. 9 is a radial cross sectional view of another rotating component defining a shaft with a heat pipe.

Referring now to FIG. 9, a plurality of heat pipes 104 of an exemplary rotating component 100 are within an area between a surface 102 defining an outer diameter and a second surface 103 defining an inner diameter of the rotating component 100 defining a shaft.

Figure 10:
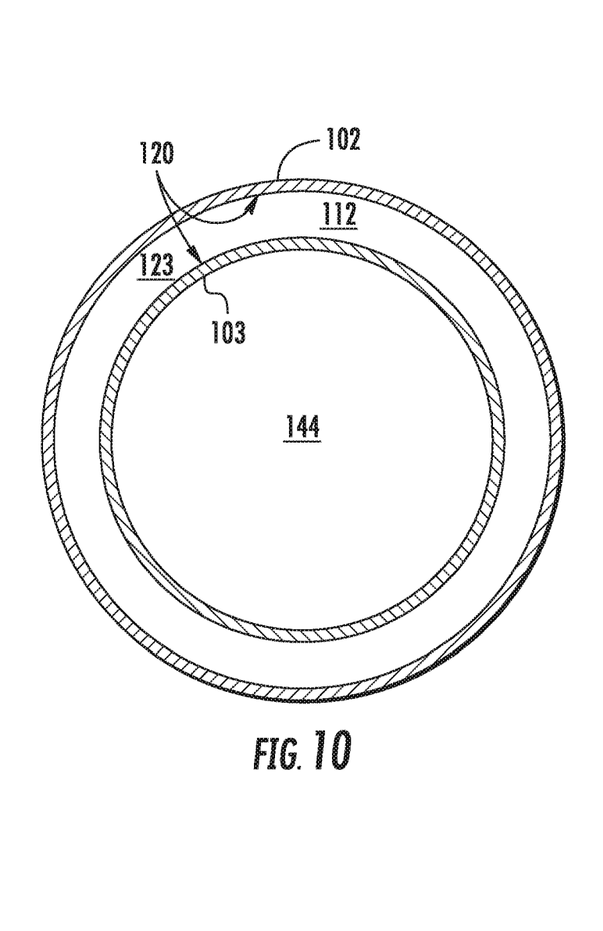
FIG. 10 is a radial cross sectional view of yet another rotating component defining a shaft with a heat pipe.

Referring now to FIG. 10, an exemplary embodiment of a rotating component 100 defining a shaft is shown in which the rotating component 100 is configured as a heat pipe 104 between a surface 102 and a second surface 103 of the rotating component 100. An outer perimeter wall 120 defines an enclosed vapor cavity 123, such as, e.g. an annulus, including an end wall 121 (not shown in FIG. 10) to retain a working fluid 112 within the vapor cavity 123, similarly as described in regard to FIG. 1.

Figure 11:
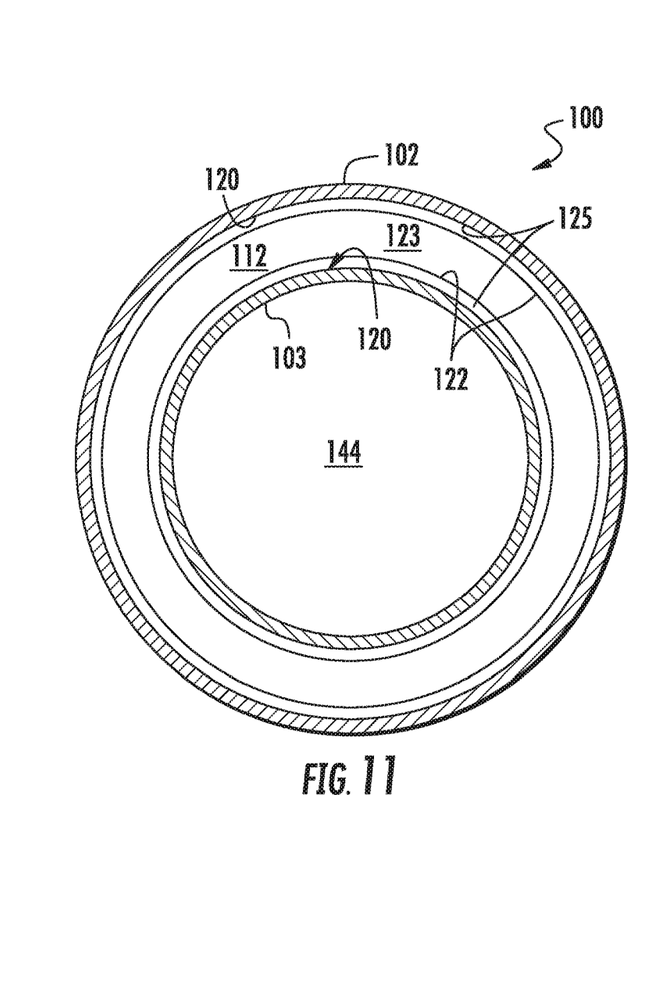
FIG. 11 is a radial cross sectional view of still another rotating component defining a shaft with a heat pipe.

Referring now to FIG. 11, an exemplary embodiment of a rotating component 100 defining a shaft is shown in which the rotating component 100 is configured as a heat pipe 104 between a surface 102 and a second surface 103 of the rotating component 100 similarly as described in regard to FIG. 2. The rotating component 100 includes an outer perimeter wall 120 radially between the surface 102 defining an outer diameter of the shaft and the second surface 103 defining an inner diameter of the shaft. The embodiment shown in FIG. 11 further includes the outer perimeter wall 120 defining a capillary tube 125 radially within the outer perimeter wall 120. The embodiment further includes an inner perimeter wall 122 defining an enclosed vapor cavity 123, such as an annulus, including an inner perimeter end wall 127 (not shown in FIG. 11) to retain the working fluid 112 within the vapor cavity 123.

Figure 12:
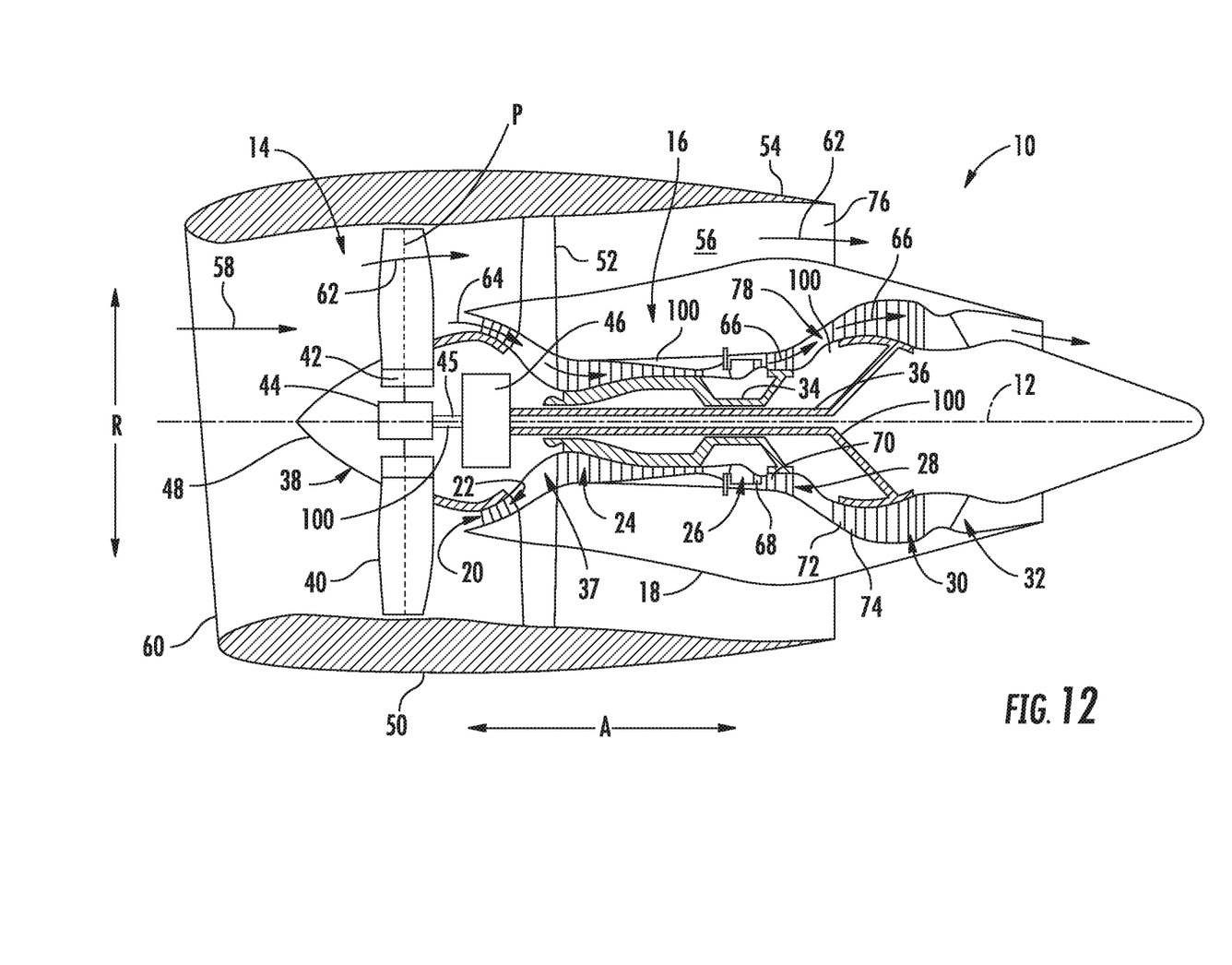
FIG. 12 is a schematic cross sectional view of an exemplary turbine engine incorporating a rotating component with a heat pipe.

Referring now to FIG. 12, a schematic cross sectional view of an exemplary turbine engine including a rotating component 100 as described in regard to FIGS. 1-11 is shown. The turbine engine shown in FIG. 12 is shown as a turbofan engine 10. As shown in FIG. 12, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 31 including a high pressure (HP) turbine 28 and a low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section 21, combustion section 26, turbine section 31, and nozzle section 32 together define a core air flowpath 37.

The LP and HP compressor 22, 24 and the HP and LP turbine 26, 28 each include a plurality of rotating components 100 defining a disk or a shaft. In one embodiment, the rotating component 100 defines a disk to which a plurality of airfoils attaches. In another embodiment, the rotating component 100 is a Blisk or IBR in which the airfoils are formed as a single, unitary structure to the disk. In yet another embodiment, the rotating components 100 defining a disk and a shaft are each fastened together by e.g. an interference fit, press fit, or friction fit between the disk and the shaft. In still another embodiment, the rotating components 100 define a plurality of disks each fastened together by mechanical fasteners such as, e.g. nuts and bolts between successive stages of disks.

In an embodiment of the engine 10 where the rotating component 100 is the HP or LP shaft 34, 36, the evaporator end 130 is disposed toward the HP or LP turbine 28, 30 and the condenser end 132 is disposed toward the LP or HP compressor 22, 24. In another embodiment of the engine 10 where the rotating component 100 is a disk in the compressor section 21 or the turbine section 31, the evaporator end 130 of the rotating component 100 is disposed in or near the core flowpath 37 and the condenser end 132 is disposed near the radially inward end connected to the HP or LP shaft 34, 36.

For the embodiment depicted, the fan section 14 includes a variable pitch fan 38 having a plurality of fan blades 40 coupled to a hub 42 in a spaced apart manner. The fan section 14 may further include the rotating component 100 described in regard to FIGS. 1-11, such as e.g. a fan shaft 45, the hub 42, or the plurality of fan blades 40. As depicted, the fan blades 40 extend outwardly from hub 42 generally along the radial direction R. Each fan blade 40 is rotatable relative to the hub 42 about a pitch axis P by virtue of the fan blades 40 being operatively coupled to a suitable actuation member 44 configured to collectively vary the pitch of the fan blades 40 in unison. The hub 42 is coupled to the fan shaft 45 extending from the power gearbox 46. The fan blades 40, hub 42, fan shaft 45, and actuation member 44 are together rotatable about the longitudinal axis 12 by LP shaft 36 across a power gearbox 46. The power gearbox 46 includes a plurality of gears for adjusting the rotational speed of the fan shaft 45 connecting the fan 38 relative to the LP shaft 36 to a more efficient rotational fan speed. In an embodiment in which the rotating component 100 is the fan shaft 45, the portion of the fan shaft 45 adjacent to the power gearbox 46 may be the evaporator end 130 of the rotating component 100 and an axially opposite end adjacent to the hub 42 may be the condenser end 132.

The power gearbox 46 may include an epicyclical gear train that includes at least two gear types, in which a sun gear is in the center of the gear train and a planet gear is in epicyclical relationship to the sun gear. In other words, the center of at least one planet gear revolves around the center of the sun gear as the sun gear rotates on its fixed axis. The planet gears are supported by a carrier, which may aid in transferring torque from the sun gear to the planet gear. The planet gears are surrounded by a fixed annular gear, of which the teeth of the planet gear ride on the annular gear and sun gear. In other embodiments, a second planet gear set is placed radially between a first planet gear set and the annular gear. In another embodiment, the epicyclical gear train is of a star gear configuration, in which the center of each planet gear is fixed such that the planet gear rotates on a fixed axis relative to the sun gear. The surrounding annular gear rotates and transfers torque from the input power transferred to the sun gear. The carrier acts as a spacer between the sun gear and the planet gears and fixes the axis of each planet gear.

Referring still to the exemplary embodiment of FIG. 12, the hub 42 is covered by rotatable spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure and temperature of the second portion of air 64 is then increased as it is routed across the axially arranged series of rotating components 100 included in the LP and HP compressors 22, 24 and into the combustion section 26, where it is mixed with fuel and burned to provide combustion gases 66.

In one embodiment of the engine 10, the air 64 across the rotating components 100 in the core flowpath 37 as it exits the compressor section 21 and enters the combustion section 26 may approach or exceed 1200 F. The resulting combustion gases 66 in the combustion section 26 may approach or exceed 3300 F before mixing with non-combusted air 64 before entering the turbine section 31. The resulting combustion gases 66 in the core flowpath 37 at the HP turbine 28 may approach or exceed 2500 F.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70. The HP turbine rotor blades 100 are coupled to rotating components 100 of the HP turbine 28, which is coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to rotating components 100 of LP turbine 30. The rotating components 100 of the LP turbine 30 are coupled to the LP shaft 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Turbine engines in general may undergo a duty cycle due to their regular cyclical use or operation. For example, turbofan engines 10 on commercial aircraft may generally undergo a duty cycle including taxi, takeoff, climb, cruise, approach, and landing. At takeoff, the engine 10 may produce a maximum takeoff thrust, followed by lesser thrust levels, with the lowest in-flight thrust level at flight idle, and the lowest thrust level above shutdown being ground idle. As the engine 10 goes through each phase of the cycle, the temperatures of the air 64 in the core flowpath 37 increase and decrease over time and thrust condition. Furthermore, though temperatures in the core flowpath 37 and, subsequently, the portions of the rotating components 100 in the core flowpath 37, become hotter as pressure increases and the air 64 becomes combustion gases 66, temperatures are generally much lower at the radially inward portions of the rotating components 100, such as, e.g. at the bore 107 or a shaft. The differences in temperature within the engine 10 and across the rotating components 100, as well as changes in the differences in temperature, define a thermal gradient that influences the structural life of rotating components 100 in the engine 10.

The rotating component 100 including the heat pipe 104 shown in FIGS. 1-12 may reduce the thermal gradient from the evaporator end 130 of the rotating component 100 to the condenser end 132 by cooling and heating each section, thereby reducing the difference in temperature between the two sections 130, 132. Reducing the thermal gradient may reduce HCF or LCF and mitigate bowed rotor. Furthermore, reducing the thermal gradient may reduce the amount of cool-down time required between engine cycles. Finally, reducing the thermal gradient may reduce or eliminate the need for cooling air to rotating components 100 directed from the thermodynamic cycle (i.e. from the core flowpath 37), increasing engine 10 efficiency and performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotating component for a turbine engine, comprising: the rotating component defining a surface, wherein the rotating component comprises a first material; and a heat pipe positioned on the surface of the rotating component or within the rotating component, wherein the heat pipe comprises a working fluid and an outer perimeter wall, wherein the outer perimeter wall comprises a second material, and further wherein the first material is different in composition relative to the second material.

2. The rotating component of claim 1, wherein the outer perimeter wall of the heat pipe defines a vapor cavity containing the working fluid.

3. The rotating component of claim 1, wherein the heat pipe further comprises:
an inner perimeter wall, wherein the outer perimeter wall and inner perimeter wall define a capillary tube radially therebetween, and wherein the inner perimeter wall defines a vapor cavity, and further wherein the inner perimeter wall permits the working fluid to condense or evaporate through the inner perimeter wall.

4. The rotating component of claim 1, wherein the working fluid comprises helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, cesium, potassium, sodium, lithium, silver, or combinations thereof.

5. The rotating component of claim 1, wherein the rotating component defines a disk having a rim and a bore.

6. The rotating component of claim 5, wherein a plurality of heat pipes radially extends on or within the disk.

7. The rotating component of claim 6, further comprising a circumferentially extending heat pipe at a radius of the disk.

8. The rotating component of claim 7, wherein the circumferentially extending heat pipe is positioned at the bore.

9. The rotating component of claim 7, wherein the circumferentially extending heat pipe is positioned at the rim.

10. The rotating component of claim 6, wherein the disk further defines a dovetail, wherein the plurality of heat pipes radially extend to the dovetail.

11. The rotating component of claim 6, wherein the disk further comprises an airfoil, wherein at least one heat pipe radially extends to the airfoil.

12. The rotating component of claim 1, wherein the rotating component defines a shaft, the shaft comprising a first end axially opposite of a second end.

13. The rotating component of claim 12, wherein the heat pipe axially extends from the first end to the second end.

14. The rotating component of claim 13 comprising a plurality of heat pipes, each heat pipe axially extending from the first end to the second end in circumferentially adjacent arrangement.

15. The rotating component of claim 12, wherein the outer perimeter wall defines an outer diameter, wherein the shaft further comprises an inner perimeter wall radially inward of the outer perimeter wall, wherein the outer perimeter wall and the inner perimeter wall define an vapor cavity therebetween, and wherein the vapor cavity contains the working fluid.

16. A turbine engine comprising:
a rotating component defining a surface, wherein the rotating component comprises a first material;
a heat pipe positioned on the surface of the rotating component or within the rotating component, wherein the heat pipe comprises a working fluid and an outer perimeter wall wherein the outer perimeter wall comprises a second material, and further wherein the first material is different in composition relative to the second material;
a compressor section;
a turbine section; and
a fan section, wherein the compressor section, the turbine section, or the fan section comprises the rotating component.

17. The turbine engine of claim 16, wherein the rotating component defines a shaft, wherein the shaft defines a first end and a second end, wherein the shaft is positioned in the fan section, and wherein the shaft is coupled at the first end to a hub and at the second end to a gearbox in the fan section.

18. The turbine engine of claim 16, wherein the rotating component defines a shaft, wherein the shaft is a high pressure shaft rotatable with a high pressure turbine and a high pressure compressor.

19. The rotating component of claim 16, wherein the rotating component defines a shaft, wherein the shaft is a low pressure shaft rotatable with a low pressure turbine and a low pressure compressor.

* * * * *